US007469412B2

(12) United States Patent  
Watanabe

(10) Patent No.: US 7,469,412 B2
(45) Date of Patent: Dec. 23, 2008

(54) DISK MISINSERTION PREVENTION MECHANISM AND DISK APPARATUS INCLUDING DISK MISINSERTION PREVENTION MECHANISM

(75) Inventor: Kazuhiro Watanabe, Echizen (JP)

(73) Assignee: Orion Electric Company, Ltd., Fukui-ken (JP)

(*) Notice: Subject to any disclaimer, the term of this patent is extended or adjusted under 35 U.S.C. 154(b) by 391 days.

(21) Appl. No.: 11/312,521

(22) Filed: Dec. 21, 2005

(65) Prior Publication Data

US 2006/0143629 A1 Jun. 29, 2006

(30) Foreign Application Priority Data

Dec. 28, 2004 (JP) ............................. 2004-380692

(51) Int. Cl.
*G11B 17/04* (2006.01)
(52) U.S. Cl. ...................................................... 720/619
(58) Field of Classification Search .......... 720/619–622
See application file for complete search history.

(56) References Cited

U.S. PATENT DOCUMENTS 6,826,766 B2* 11/2004 Tuchiya ...................... 720/620
6,839,898 B2* 1/2005 Saji et al. .................... 720/619
7,100,178 B2* 8/2006 Ho et al. ..................... 720/621
2005/0198656 A1* 9/2005 Yamamoto et al. .......... 720/616

FOREIGN PATENT DOCUMENTS

| JP | 07-230652 | 2/1994 |
| JP | 08-180540 | 12/1994 |
| JP | 2002-260316 | 2/2001 |
| JP | 2002-269882 | 3/2001 |
| JP | 2003-228903 | 2/2002 |
| JP | 2003-331495 | 5/2002 |
| JP | 2004-022128 | 6/2002 |

* cited by examiner

*Primary Examiner*—Mark Blouin
(74) *Attorney, Agent, or Firm*—Reed Smith LLP; Stanley P. Fisher, Esq.; Juan Carlos A. Marquez, Esq.

(57) ABSTRACT

An arm member is rotated when a disk is inserted into a disk apparatus from a disk insertion port while a circumferential edge of the disk abuts on a protrusion of the arm member for intercepting misinsertion of the disk. The arm member detects whether the disk inserted into the disk apparatus is present. When the disk is stored in the disk apparatus, the protrusion is arranged near the disk insertion port by the rotation of the arm member. If a disk other than the disk stored in the disk apparatus is to be erroneously inserted from the disk insertion port, the arm member that detects whether the disk is present is used as means for intercepting misinsertion of the other disk.

5 Claims, 10 Drawing Sheets

US 7,469,412 B2

DISK MISINSERTION PREVENTION MECHANISM AND DISK APPARATUS INCLUDING DISK MISINSERTION PREVENTION MECHANISM

BACKGROUND OF THE INVENTION

1. Field of the Invention

The present invention relates to a disk misinsertion prevention mechanism of a disk apparatus that can record and reproduce data in and from a disk as a recording medium, such as a digital versatile disk (DVD), and a disk apparatus that includes the disk misinsertion prevention mechanism.

2. Description of the Related Art

Conventionally, an electronic apparatus such as a television receiver, which includes therein a disk apparatus into which a flat disk such as a compact disk recordable (CD-R) is inserted, and which can record and reproduce data such as voice and video data in and from the disk has been employed. In recent years, in view of reducing a thickness of the apparatus or reducing the number of components, not a tray type disk apparatus configured so that a disk is mounted on a tray to be carried into a predetermined position of the disk apparatus but a so-called slot-in type disk apparatus configured so that a disk is directly inserted into the disk apparatus has become popular. The slot-in type disk apparatus has, however, the following disadvantages. Once the disk is inserted into the disk apparatus, a user or the like cannot confirm thereafter whether or not the disk is stored in the disk apparatus unless the user or the like operates an eject button or the like for discharging the disk. The operation is quite cumbersome. In addition, in case of the slot-in type disk apparatus, it is normally possible to always insert a part of the disk from an insertion section whether or not the disk is arranged within the disk apparatus. For this reason, if a different new disk is to be erroneously inserted into the disk apparatus while a disk is already stored in the apparatus, the different new disk may possibly contact with a member within the disk apparatus or with the previously inserted disk to thereby damage a surface of the disk.

To solve these disadvantages, a disk misinsertion prevention apparatus configured so that a second misinsertion prevention protrusion is protruded or retreated at a disk insertion port so as to prevent misinsertion of a new disk after a disk is already stored in a disk apparatus is disclosed in Japanese Patent Application Laid-Open No. 2002-260316. In addition, a disk apparatus that includes a disk detection mechanism of a disk player for detecting insertion of a disk and discriminating whether the disk is any one of two types of disks, i.e., a larger disk or a smaller disk which differ in diameter is disclosed in Japanese Patent Application Laid-Open No. 2003-228903.

However, the disk misinsertion prevention apparatus disclosed in the Japanese Patent Application Laid-Open No. 2002-260316 has the following disadvantage. It is true that the second misinsertion prevention protrusion can prevent misinsertion of another new disk after a disk is already stored in the disk apparatus and can prevent a failure such as a damage of the disk. Nevertheless, the second misinsertion prevention protrusion simply includes a function of preventing disk misinsertion. Further, the technique disclosed in the Japanese Patent Application Laid-Open No. 2003-228903 has the following disadvantage. Although the disk detection mechanism can discriminate whether the disk is a larger disk or a smaller disk different in diameter, a mechanism for preventing disk misinsertion is neither disclosed nor suggested in this document.

SUMMARY OF THE INVENTION

The present invention has been achieved to solve the conventional disadvantages. It is an object of the present invention to provide a disk misinsertion prevention mechanism capable of preventing misinsertion of another new disk when a disk is already inserted into the disk apparatus, and configured so that an arm member that detects insertion of a disk is used as the disk misinsertion prevention mechanism so as to reduce the number of components, and a disk apparatus including the disk misinsertion prevention mechanism.

According to a first aspect of the present invention, there is provided a disk misinsertion prevention mechanism of a disk apparatus which can record and reproduce data in and from a disk, wherein the disk misinsertion prevention mechanism includes an arm member having a protrusion, when the disk is inserted from a disk insertion port of the disk apparatus into the disk apparatus, the arm member is rotated by inserting the disk from the disk insertion port of the disk apparatus into the disk apparatus while abutting a circumferential edge of the disk against the protrusion of the arm member, and detects whether the disk inserted into the disk apparatus is present, when the disk inserted from the disk insertion port is stored in the disk apparatus, the protrusion is arranged near the disk insertion port by the rotation of the arm member, and if a disk other than the disk stored in the disk apparatus is to be erroneously inserted into the disk apparatus from the disk insertion port, the arm member that detects whether the disk is present is used as means for intercepting misinsertion of the other disk.

According to a second aspect of the present invention, in the disk misinsertion prevention mechanism of the first aspect, the disk is one of a plurality of types of disks having different diameters of eight and twelve centimeters.

According to a third aspect of the present invention, there is provided a disk apparatus including the disk misinsertion prevention mechanism according to the first or second aspect, wherein the arm member that detects whether the disk to be inserted into the disk apparatus is present is used as the disk misinsertion prevention mechanism.

According to a fourth aspect of the present invention, there is provided a disk apparatus including a disk misinsertion prevention mechanism including: a rack plate provided on a chassis of the disk apparatus into which a disk is inserted from a disk insertion port and which records and reproduces data in and from the disk, the rack plate moved sequentially with storing of the disk; a roller that carries the disk to a predetermined position of the disk apparatus; driving means for driving the roller to rotate; and an arm member that includes a protrusion arranged near the disk insertion port while the disk is stored in the predetermined position of the disk apparatus, wherein when the disk is stored in the predetermined position of the disk apparatus by the roller, then the arm member rotated with the protrusion abutted against a circumferential edge of the disk detects whether the disk inserted into the disk apparatus is present by a rotation operation of the arm member, an engagement portion is provided on the rack plate moved sequentially with the storing of the disk into the disk apparatus, the arm member is rotated when the disk inserted from the disk insertion port is stored in the disk apparatus, whereby the protrusion is arranged near the disk insertion port and the protrusion provided on the arm member is engaged with the engagement portion of the rack plate moved sequentially with the storing of the disk into the disk apparatus, and if a disk other than the disk stored in the disk apparatus is to be erroneously inserted into the disk apparatus from the disk insertion port, the arm member that detects whether the disk is present is used as means for intercepting misinsertion of the other disk.

According to the first aspect of the present invention, if the disk is inserted into the disk apparatus from the disk insertion port, the arm member is rotated. This rotation operation enables the arm member to detect whether the disk is present. In addition, the protrusion of the arm member is arranged near the disk insertion port so as not to erroneously insert the other disk while the disk is already stored in the disk apparatus. Therefore, by using the arm member that detects whether the disk is present as means for intercepting misinsertion of the disk, the number of components of the disk apparatus can be reduced. Thus the number of components of the disk apparatus and cost can be reduced.

According to the second aspect of the present invention, since the disk apparatus can record and reproduce data in and from any one of the disks different in diameter, the disk apparatus is excellent in practicability. In addition, while the disk is stored in the disk apparatus, the arm member can intercept insertion of a disk other than the disk stored in the apparatus from the disk insertion port. Thus the number of components of the disk apparatus and cost can be reduced.

According to the third aspect of the present invention, if the disk is inserted into the disk apparatus from the disk insertion port, the arm member is rotated. This rotation operation enables the arm member to detect whether the disk is present. In addition, the protrusion of the arm member is arranged near the disk insertion port so as not to erroneously insert the other disk while the disk is already stored in the disk apparatus. Therefore, it is possible to provide the disk apparatus capable of reducing the number of components by using the arm member that detects whether the disk is present as means for intercepting misinsertion of the disk. Thus the number of components of the disk apparatus and cost can be reduced.

According to the fourth aspect of the present invention, if the disk is inserted into the disk apparatus from the disk insertion port, the arm member is rotated with the circumferential edge of the disk abutting against the protrusion of the arm member. Such a rotation operation of the arm member enables detection as to whether the disk inserted into the disk apparatus is present. In addition, when the disk is to be stored in the disk apparatus, the disk inserted into the disk insertion port is carried to the predetermined position of the disk apparatus and stored in the predetermined position by causing the driving means to drive the roller. In this case, the protrusion of the rotated arm member is engaged with the engagement portion of the rack plate moved sequentially with storing of the disk in the predetermined position, the protrusion of the arm member is held and arranged near the disk insertion port so as to prevent misinsertion of another disk into the disk apparatus from the disk insertion port. Therefore, while the disk is stored in the disk apparatus, the protrusion of the arm member is held near the disk insertion port so as to prevent misinsertion of another disk, and the arm member that detects whether a disk is present can be used as means for intercepting misinsertion of the disk. Thus the number of components of the disk apparatus and cost can be reduced.

DESCRIPTION OF THE PREFERRED EMBODIMENT

A most preferred embodiment of the present invention will be described hereinafter with reference to FIGS. 1 to 10. Needless to say, the present invention is applicable to configurations other than that described in the embodiment within the scope of the present invention.

Figure 1:
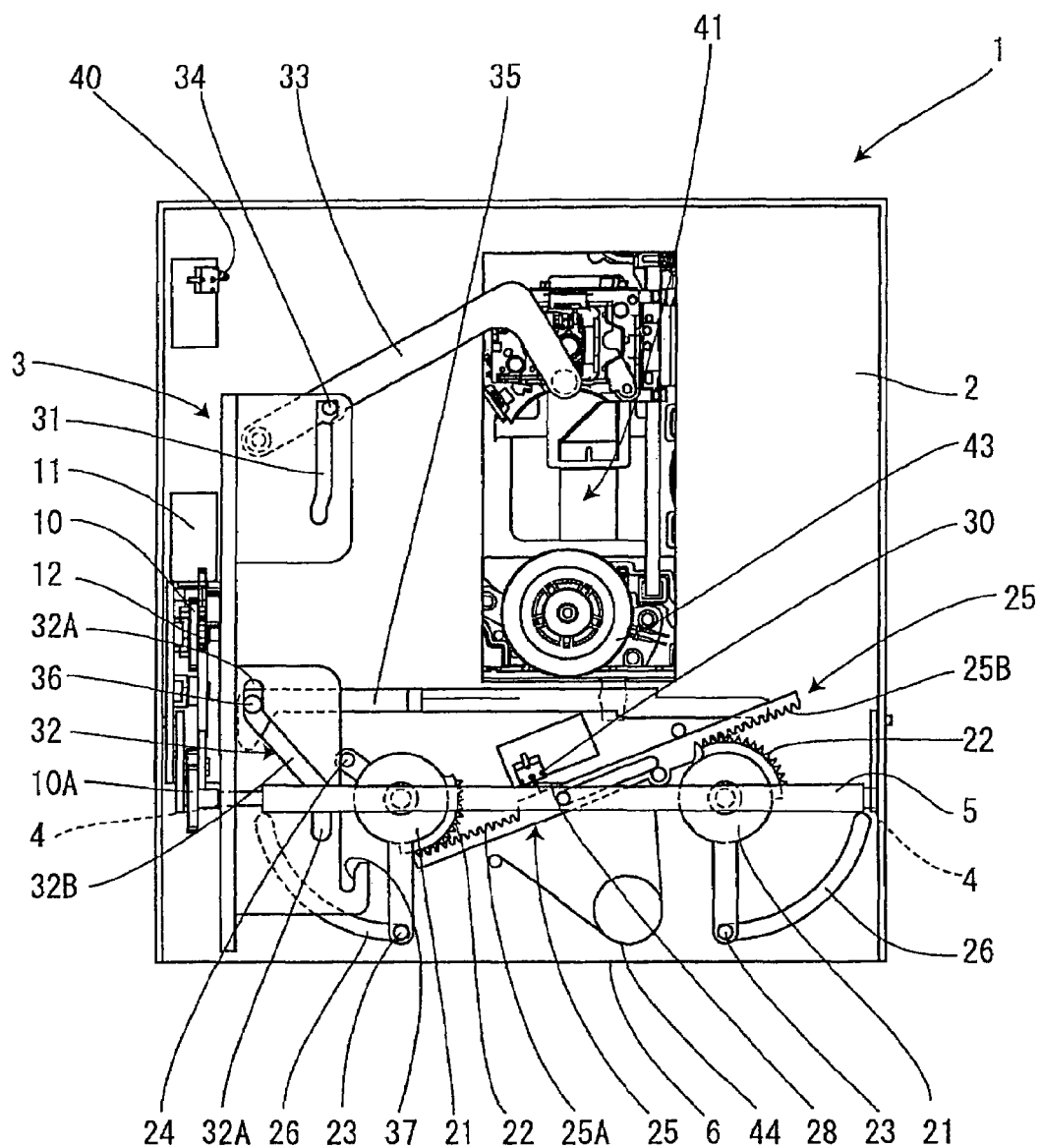
FIG. 1 is a perspective plan view of a disk apparatus according to an embodiment of the present invention viewed from above.
Figure 2:
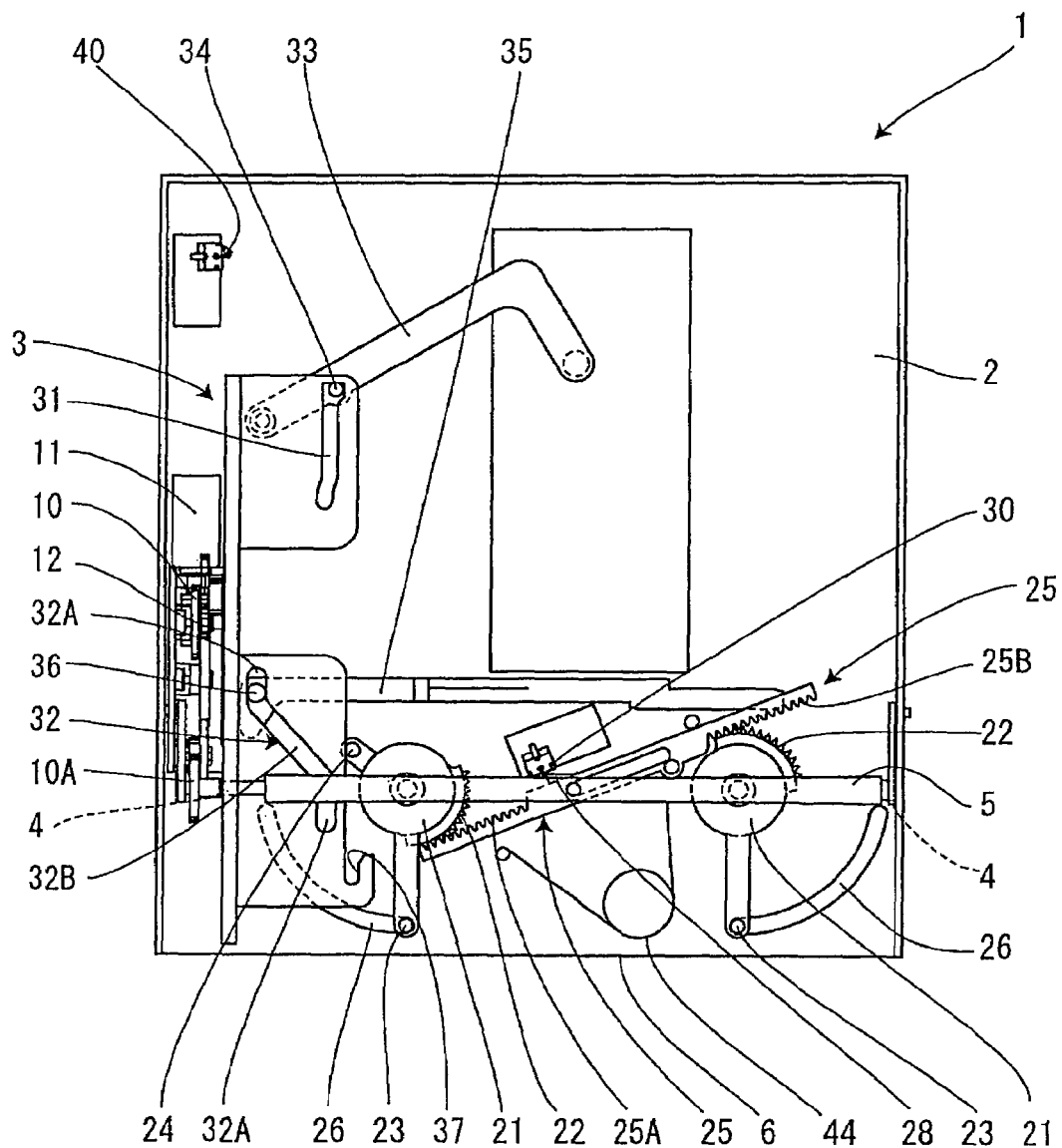
FIG. 2 is a schematic explanatory view of the disk apparatus according to the embodiment viewed from above.
Figure 3:
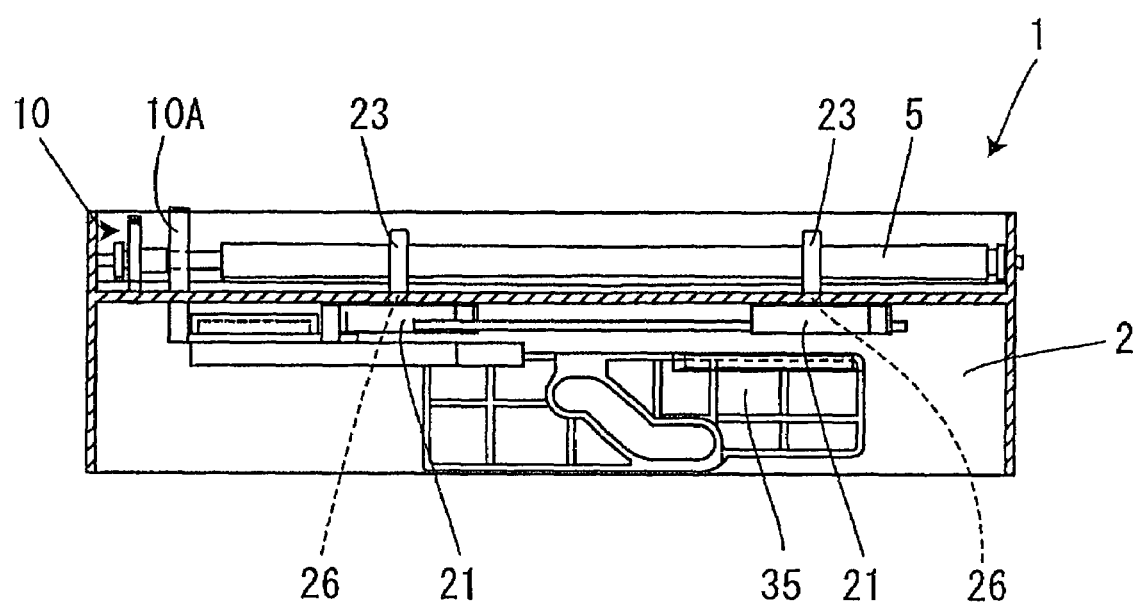
FIG. 3 is a schematic cross-sectional view of the disk apparatus according to the embodiment viewed from front.
Figure 4:
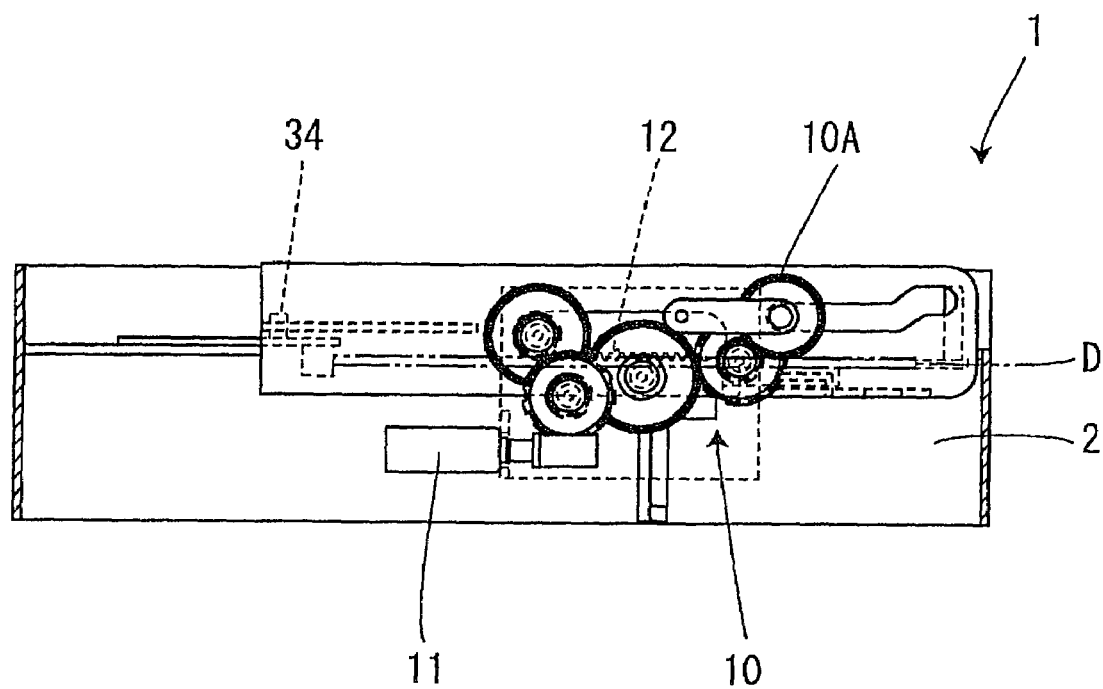
FIG. 4 is a schematic explanatory view that depicts a cross section of the disk apparatus according to the embodiment viewed from side.

FIG. 1 is a perspective plan view of a disk apparatus according to the embodiment of the present invention viewed from above. FIG. 2 is a schematic explanatory view of the disk apparatus viewed from above. FIG. 3 is a schematic cross-sectional view of the disk apparatus viewed from front. FIG. 4 is a schematic explanatory view that depicts a cross section of the disk apparatus viewed from side.

A slot-in type disk apparatus 1 shown in these drawings can record and reproduce data in and from a disk D which is one of two types of disks having different diameters, i.e., eight centimeters or twelve centimeters. The disk apparatus 1 includes a rack plate 3 attached to a chassis 2 so that the rack plate 3 can be moved forward and backward. An end of a roller 5 is inserted into a hole 4 formed in the rack plate 3 and the chassis 2, and the roller 5 is rotatably, axially supported by the chassis 2.

A gear 10A is fixed to one end of the roller 5 axially supported by the chassis 2 and carrying the disk D. A plurality of rotatable gears 10 including the gear 10A are engaged with one another so as to transmit a driving force. The driving force generated by a motor 11 serving as driving means enables a rack gear 12 formed on the rack plate 3 to be engaged with one of the gears 10 for transmitting the driving force of the motor 11. The rack plate 3 is thereby driven to be moved forward and backward by the motor 11.

Figure 6:
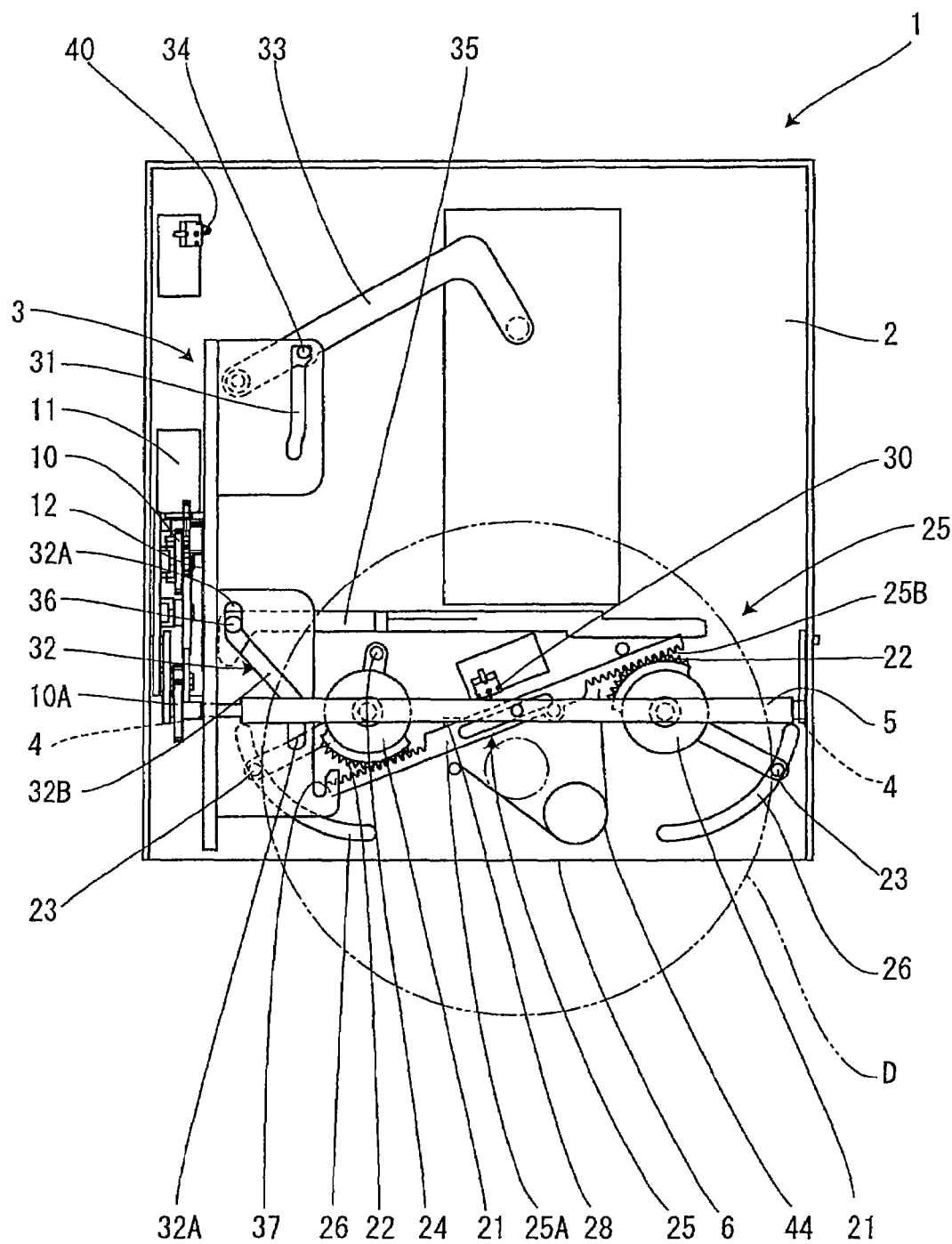
FIG. 6 is a schematic explanatory view of the disk apparatus according to the embodiment in a state in which the disk is being inserted into the disk apparatus.

Reference symbol 21 denotes a rotatable arm member arranged in parallel to a width direction of the disk apparatus 1 and provided in the chassis 2 arranged in a front portion of the disk apparatus 1. A pair of rotatable arm members 21 are provided. Each of these arm members 21 includes a circular arc-shaped gear portion 22 and a mechanism that detects whether or not the disk D is already stored into the disk apparatus 1. A protrusion 23 is provided integrally with each arm member 21. An arm protrusion 24 is provided integrally with one of the arm members 21. Rack portions 25A and 25B formed on both sides of a link arm 25 slidably attached to the chassis 2 are engaged with the gear portions 22, respectively. When the disk D is inserted into the disk apparatus 1, a circumferential edge of the disk D presses the protrusions 23 fitted into circular arc-shaped guide grooves 26 formed in the chassis 2, respectively, and the protrusions 23 are thereby slidably moved along the guide grooves 26. The arm members 21 are rotated sequentially with this operation. Namely, when the link arm 25 is moved in a longitudinal direction thereof, a protruding rib 28 of the link arm 25 presses a lever switch 30 fixed to the chassis 2. If the motor 11 is driven, then the motor 11 drives the roller 5 to rotate via the gears 10, and the disk D which is in contact with the roller 5 and which is being inserted into the disk apparatus 1, as shown in FIG. 6, is moved to a predetermined position in the disk apparatus 1 (a state shown in FIG. 7). The mechanism for detecting whether the disk D is stored into the disk apparatus 1 functions as follows. If the protrusions 23 of the arm members 21 serving as mechanical detection means are pressed by the circumferential edge of the disk D and moved, the mechanism determines that a disk is not present, i.e., no disk is inserted (the apparatus 1 is in a disk non-insertion state). If the protrusions 23 are not moved even if being pressed by the circumferential edge of the disk D, the mechanism determines that the disk is present, i.e., the disk is inserted (the apparatus 1 is in a disk insertion state). As a modification of such detection means, electric detection means can be employed. Namely, if the rack plate 3 does not press an end switch 40, the electric detection means detects that the disk apparatus 1 is in the disk no-insertion state. If the rack plate 3 is moved to a rear side of the disk apparatus 1 and presses the end switch 40, the electric detection means detects that the disk apparatus 1 is in the disk insertion state.

Figure 7:
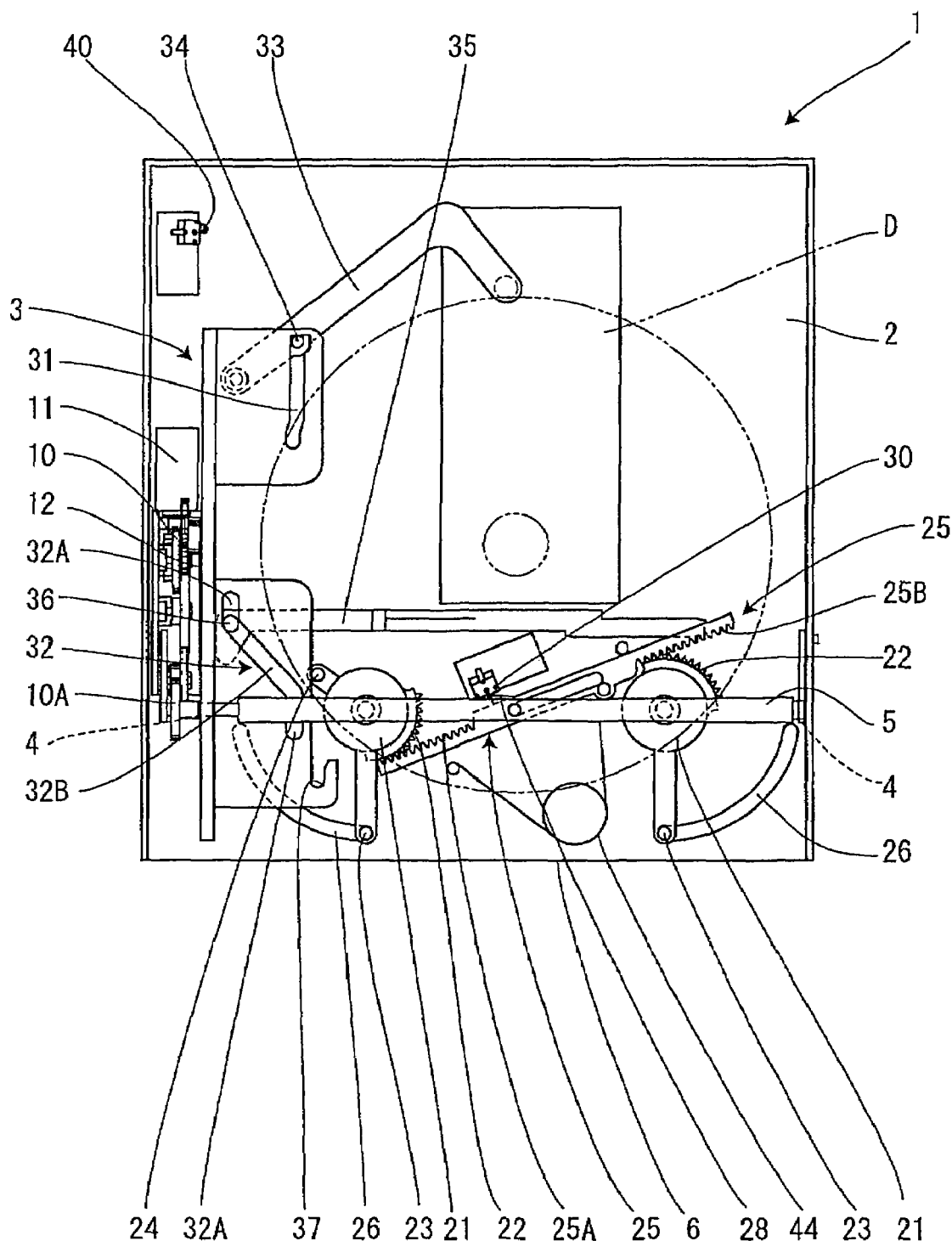
FIG. 7 is a schematic explanatory view of the disk apparatus according to the embodiment viewed from above in a state in which an arm is rotated by insertion of the disk.

An elongate hole-like cam groove 31 and a slide groove 32 are formed in the rack plate 3. A convex portion 34 of an L-shaped arm 33 having one end rotatably and pivotally supported by the chassis 2 is slidably fitted into the cam groove 31 along the cam groove 31. In addition, a traverse rod 35 slidable in the width direction of the disk apparatus 1 is attached to the slide groove 32 in the chassis 2. As shown in FIG. 7, the L-shaped arm 33 is rotated while a rear portion of the circumferential edge of the disk D presses the L-shaped arm 33 rearward. Sequentially with this operation, the rack plate 3 is moved backward. In this case, sequentially with this backward movement of the rack plate 3, a protrusion portion 36, which is provided on one end of the traverse rod 35 and which is fitted into the slide groove 32 constituted by a parallel portion 32A and an inclined portion 32B, is moved along the slide groove 32. The traverse rod 35 is thereby slidably moved in the width direction of the disk apparatus 1 (in a right direction in FIG. 9). The arm protrusion 24 extending from one of the arm members 21 is engaged with an engagement portion 37 formed on the rack plate 3, whereby the arm member 21 is fixed without being rotated. As a result, even if another disk is to be inserted into the disk apparatus 1 in which the disk D is already stored from a disk insertion port 6 formed in a front portion of the disk apparatus 1, the protrusions 23 of the arm members 21 are arranged while being held near the disk insertion port 6 of the disk apparatus 1. The protrusions 23 can, therefore, intercept misinsertion of the disk D.

Reference symbol 40 denotes the lever end switch for stopping driving of the motor 11. If the L-shaped arm 33 is rotated and the rack plate 3 is moved backward, a rear portion of this rack plate 3 depresses the end switch 40, thereby stopping the driving of the motor 11.

Figure 5:
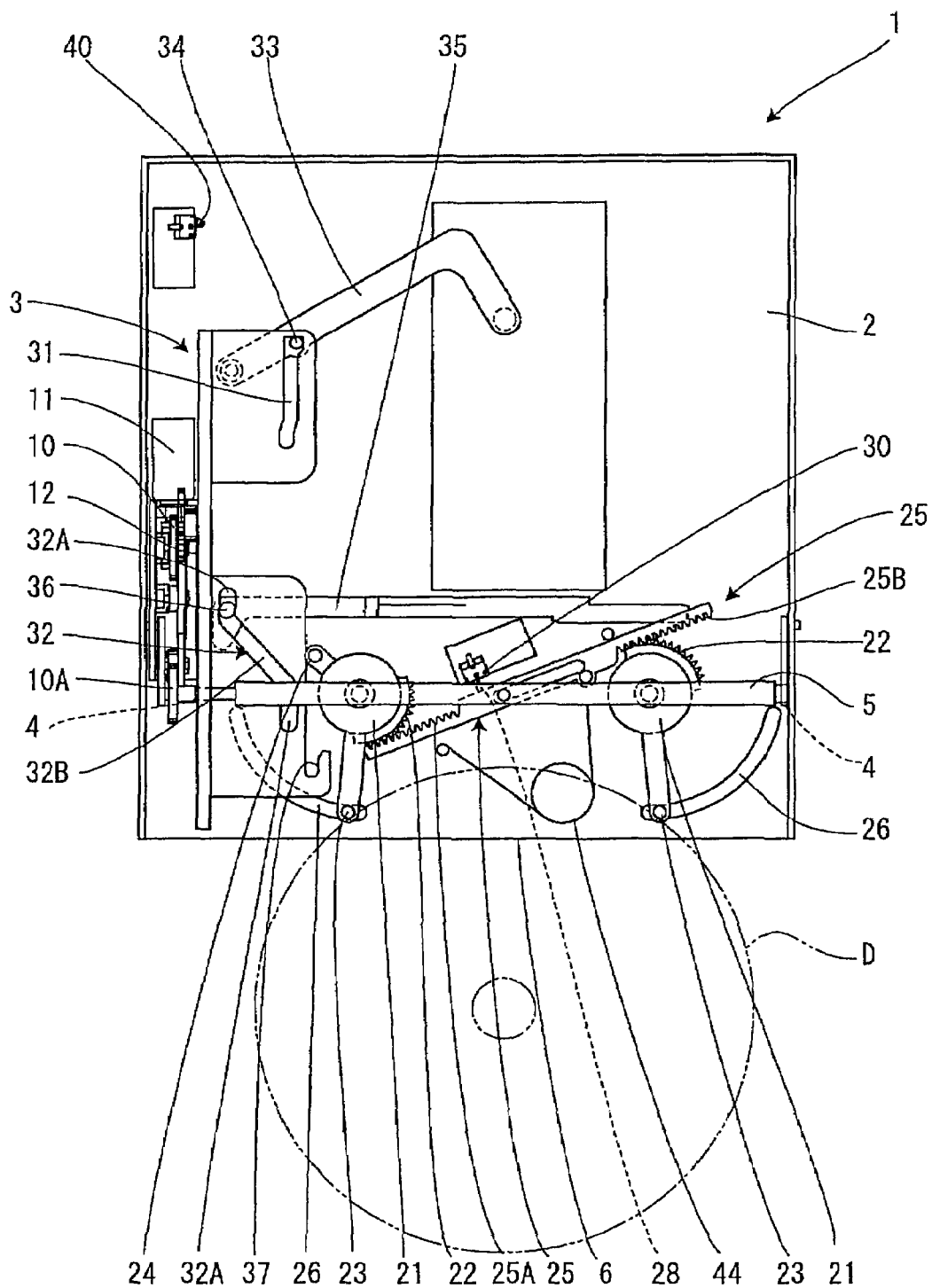
FIG. 5 is a schematic explanatory view of the disk apparatus according to the embodiment in a state in which a disk is to be inserted into the disk apparatus.
Figure 8:
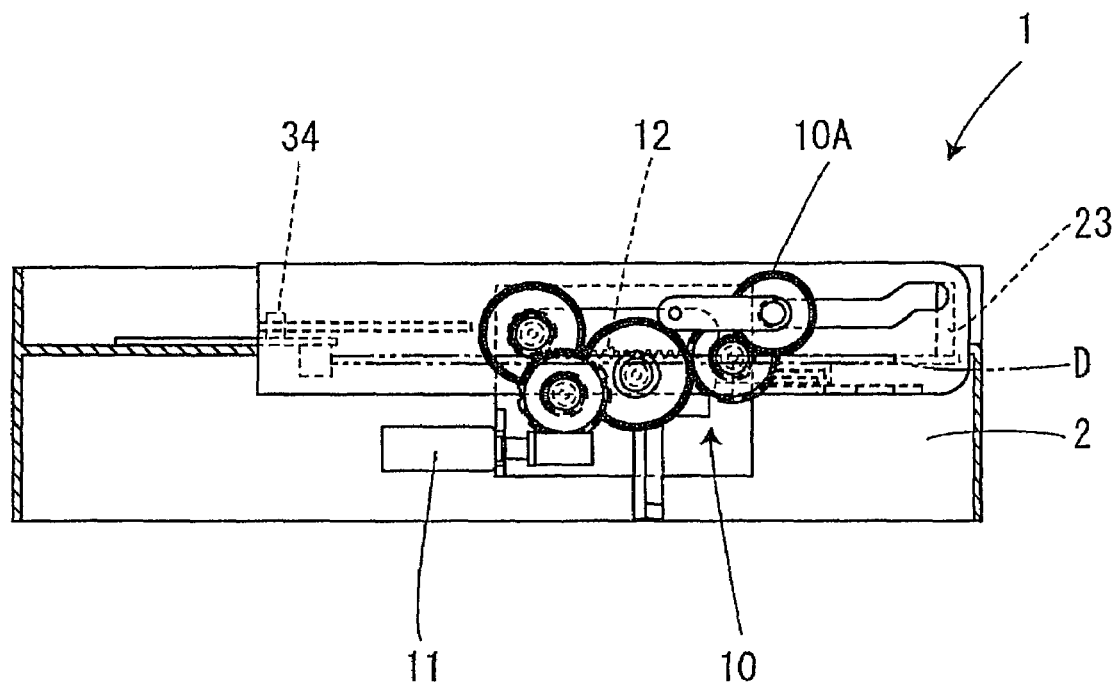
FIG. 8 is a schematic explanatory view of the disk apparatus according to the embodiment viewed from side in the state in which the arm is rotated by insertion of the disk.
Figure 9:
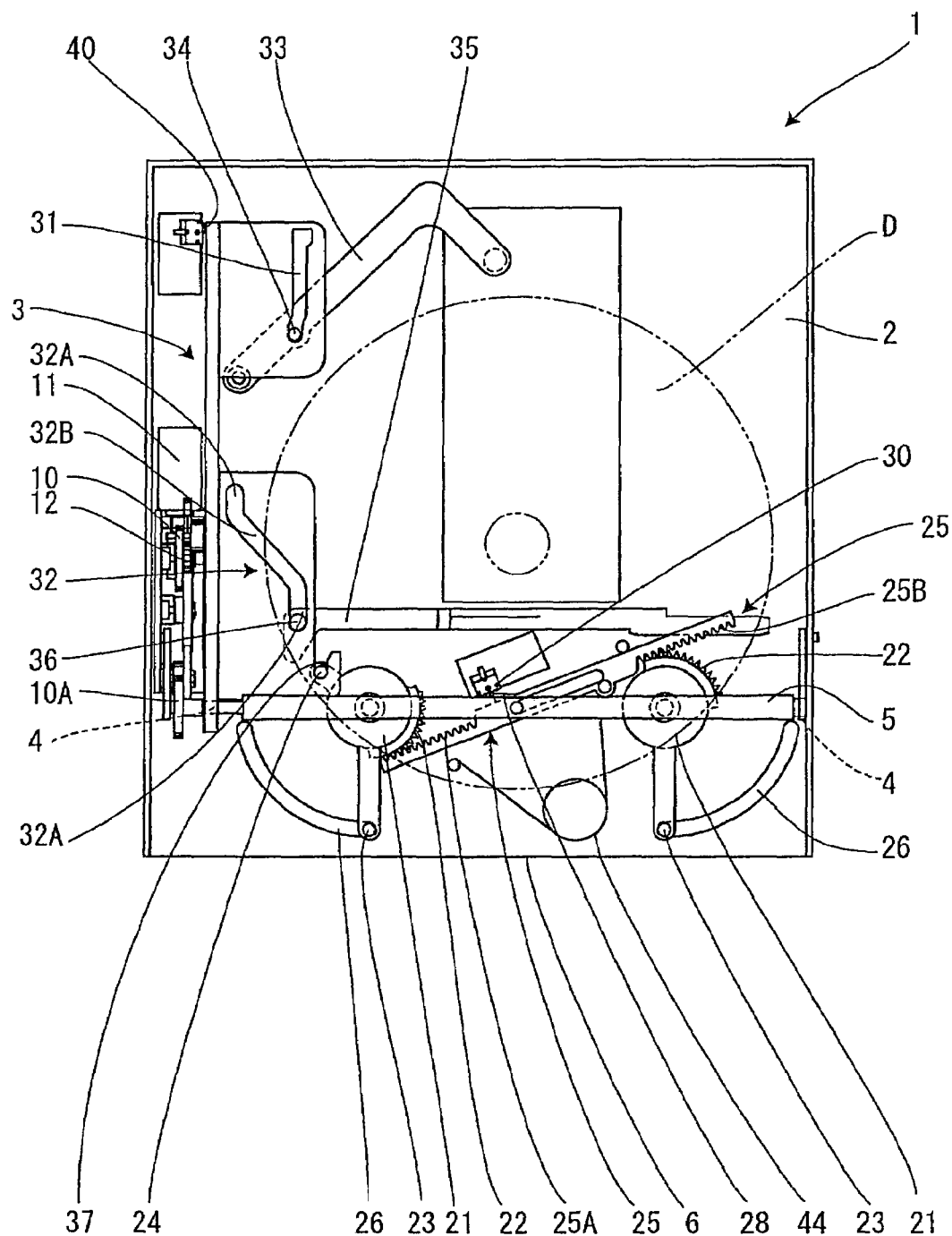
FIG. 9 is a schematic explanatory view of the disk apparatus according to the embodiment viewed from above in a state in which the disk is completely stored in a predetermined position of the disk apparatus and the arm members are held.
Figure 10:
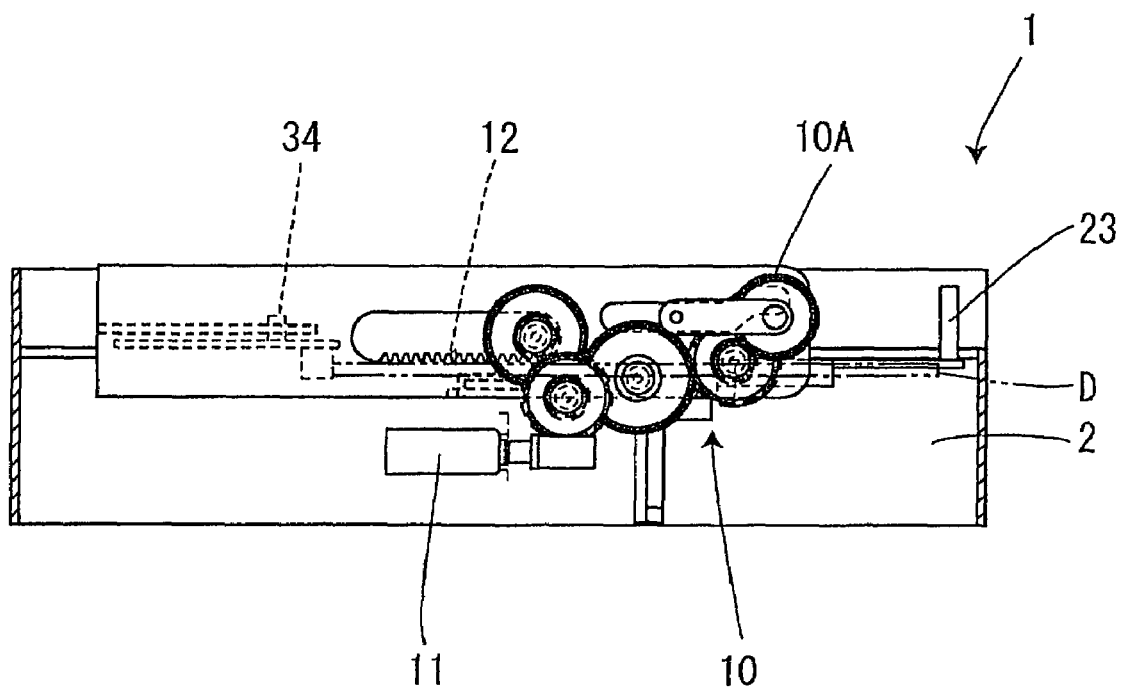
FIG. 10 is a schematic explanatory view of the disk apparatus according to the embodiment viewed from side in a state in which the disk is completely stored in the predetermined position of the disk apparatus and the arm members are held.

Operation procedures for the disk apparatus 1 will next be described with reference to FIGS. 2 to 10. FIG. 5 is a schematic explanatory view of the disk apparatus 1 in a state in which the disk D is to be inserted. FIG. 6 is a schematic explanatory view of the disk apparatus 1 in a state in which the disk D is being inserted. FIG. 7 is a schematic explanatory view of the disk apparatus 1 in a state in which the L-shaped arm 33 is rotated to follow insertion of the disk D, the disk apparatus 1 viewed from above. FIG. 8 is a schematic explanatory view of the disk apparatus 1 in a state in which the L-shaped arm 33 is rotated to follow insertion of the disk D, the disk apparatus 1 viewed from side. FIG. 9 is a schematic explanatory view of the disk apparatus 1 in a state in which the disk D is completely inserted into a predetermined position of the disk apparatus 1 and in which the arm members 21 are held, the disk apparatus 1 viewed from above. FIG. 10 is a schematic explanatory view of the disk apparatus 1 in a state in which the disk D is completely inserted into the predetermined position of the disk apparatus 1 and in which the arm members 21 are held, the disk apparatus 1 viewed from side. If the disk D is to be inserted into the disk apparatus 1 from the disk insertion port 6 in the front portion of the chassis 2 in the disk non-insertion state in which the disk D is not inserted into the disk apparatus 1 as shown in FIGS. 2 to 4, then the rear portion of the inserted disk D presses the protrusions 23 of the arm members 21 as shown in FIG. 5, and the protrusions 23 are moved along the respective guide grooves 26 from inside to outside of the disk apparatus 1 as shown in FIG. 6. If so, the arm members 21 provided with the protrusions 23 are rotated. Sequentially with this rotation operation of the arm members 21, the link arm 25 is slidably moved in the longitudinal direction, apart of the link arm 25 comes in contact with and depresses the switch 30, and the motor 11 is thereby driven. The roller 5 is driven to rotate through the gears 10 to follow driving of the motor 11, and the disk D which is being inserted and which is in contact with the roller 5 is carried to and arranged at the predetermined position of the disk apparatus 1 (the state shown in FIG. 7). When the disk D is carried to the predetermined position, the rear portion of the circumferential edge of the disk D presses one end of the L-shaped arm 33. In addition, the L-shaped arm 33 is rotated (counterclockwise as shown in FIG. 7) by leverage with the other end of the L-shaped arm 33 used as a fulcrum. The convex portion 34 of the L-shaped arm 33 is moved rearward along the cam groove 31, and the rack plate 3 which can be moved forward and backward is moved backward accordingly. The rack plate 3 thus moved backward depresses the end switch 40, whereby the driving of the motor 11 is stopped, and the protrusions 23 of the arm members 21 are moved from outside to inside along the respective guide grooves 26 by an urging force of a torsion spring 44 which is an elastic body. If the protrusions 23 of the arm members 21 are moved from outside to inside along the respective guide grooves 26, the arm protrusion 24 of one of the arm members 21 is engaged with the engagement portion 37. As shown in FIG. 9, the paired protrusions 23 are held in the front portion of the disk apparatus 1. The arm members 21 each including the protrusion 23 for detecting whether the disk D is inserted can be used to ensure intercepting misinsertion of the disk D into the disk apparatus 1.

As can be seen, by so constituting as described above, if the disk D is inserted into the disk apparatus 1 from the disk insertion port 6, then the arm member 21 is rotated and this rotation operation enables the arm member 21 to detect whether the disk D is present. Further, while the disk D is stored in the disk apparatus 1, the protrusion 23 of the arm member 21 is arranged near the disk insertion port 6 so as to prevent misinsertion of the other new disk. Therefore, by using one of the arm members 21 that detect whether the disk D is present as the means for intercepting the misinsertion of the disk, the number of components of the disk apparatus 1 can be reduced.

Furthermore, if the disk apparatus 1 is configured to be able to record and reproduce or either record or reproduce data in and from one of a plurality of types of standardized disks having different diameters of eight and twelve centimeters, the disk apparatus 1 exhibits versatility and therefore practicability thereof is improved. Further, while the disk D is stored in the disk apparatus 1, the user or the like can intercept misinsertion of the other disk than the disk D stored in the disk apparatus 1 from the disk insertion port 6 using the arm member 21. It is, therefore, possible to prevent the other disk from contacting with the disk D stored in the disk apparatus 1 due to the misinsertion of the other disk and prevent the disk D apt to be damaged from being damaged.

Moreover, the arm member 21 that detects whether the disk D inserted into the disk apparatus 1 is present is used as the disk misinsertion prevention mechanism. By doing so, if the disk D is inserted into the disk apparatus 1 from the disk insertion port 6, the arm member 21 is rotated. This rotation operation enables the arm member 21 to detect whether the disk D is present. Besides, while the disk D is stored in the disk apparatus 1, the protrusion 23 of the arm member 21 is held and arranged near the disk insertion port 6 so as to prevent the misinsertion of the other disk. Therefore, by using the arm member 21 that detects whether the disk D is present as the means for intercepting the misinsertion of the disk, it is possible to provide the disk apparatus 1 capable of reducing the number of components.

As stated so far, according to the disk apparatus 1 as one embodiment of the present invention, if the disk D is to be inserted into the disk apparatus 1 from the disk insertion port 6, each arm member 21 is rotated while the circumferential edge of the disk D is abutted against the protrusion 23 of the arm member 21. This rotation operation of the arm member 21 enables detecting whether the disk D inserted into the disk apparatus land already stored therein is present. In addition, if the disk D is to be stored in the disk apparatus 1, the motor 11 serving as the driving means drives the roller 5 to carry the disk D which is being inserted into the disk insertion port 6 to the predetermined position of the disk apparatus 1 and to store the disk D therein. In this case, the arm protrusion 24 of one of the rotated arm members 21 is engaged with the engagement portion 37 of the rack plate 3 which is moved sequentially with the storing of the disk D in the predetermined position. The protrusion 23 of each arm member 21 is held and arranged near the disk insertion port 6 so as to prevent the misinsertion of the other disk into the disk apparatus 1 from the disk insertion port 6. Namely, in the state in which the disk D is stored in the disk apparatus 1, the protrusion 23 of the arm member 21 can be held near the disk insertion port 6 so as to prevent the misinsertion of the other disk into the apparatus 1, and the arm member 21 that detects whether the disk D is present can be also used as the means for intercepting misinsertion of the other disk. Thus, the disk apparatus 1 which makes it possible to reduce the number of components, to reduce failures such as a breakdown, and to reduce cost can be provided.

The embodiment of the present invention has been described so far in detail. However, the present invention is not limited to this embodiment but various modifications can be made of the present invention within the scope of the invention. For example, the diameters of the disks D stored in the disk apparatus 1 are eight and twelve centimeters. However, the diameters of the disks D are not limited thereto but may be other values. In the embodiment, the arm protrusion 24 of one of the arm members 21 is engaged with the engagement portion 37 of the rack plate 3, and the protrusions 23 of the arm members 21 are held near the disk insertion port 6 provided in the front portion of the disk apparatus 1. However, the present invention is not limited thereto. As long as the protrusions 23 can be held, a protruding rib may be formed on the traverse rod 35 instead of forming the arm protrusion 24 on one arm member 21, and a convex portion or a concave portion engaged with this protruding rib may be formed on the link arm 25. By doing so, the protrusions 23 can be similarly held near the disk insertion port 6.

What is claimed is:

1. A disk misinsertion prevention mechanism of a disk apparatus which can record and reproduce data in and from a disk,
    wherein the disk misinsertion prevention mechanism includes an arm member having a protrusion,
    wherein when the disk is inserted from a disk insertion port of the disk apparatus into the disk apparatus storing no disk, the arm member is rotated by inserting the disk from the disk insertion port of the disk apparatus into the disk apparatus while abutting a circumferential edge of the disk to the protrusion of the arm member,
    wherein the arm member detects whether or not a disk is present in the disk apparatus by rotation of the arm member, and
    wherein when the disk inserted from the disk insertion port is stored in the disk apparatus, the protrusion is arranged near the disk insertion port so that the protrusion prevents another disk from being inserted into the disk apparatus through the disk insertion port.

2. The disk misinsertion prevention mechanism according to claim 1, wherein the disk is one of a plurality of types of disks having different diameters of eight and twelve centimeters.

3. A disk apparatus including a disk misinsertion prevention mechanism, comprising:
    a rack plate provided on a chassis of the disk apparatus into which a disk is inserted from a disk insertion port and which records and reproduces data in and from the disk, the rack plate moved sequentially with storing of the disk;
    a roller that carries the disk to a predetermined position of the disk apparatus;
    driving means for driving the roller to rotate; and
    an arm member that includes a protrusion arranged near the disk insertion port while the disk is stored in the predetermined position of the disk apparatus, wherein
    when the disk is stored in the predetermined position of the disk apparatus by the roller, then the arm member rotated with the protrusion abutted against a circumferential edge of the disk detects whether the disk inserted into the disk apparatus is present by a rotation operation of the arm member,
    an engagement portion is provided on the rack plate moved sequentially with the storing of the disk into the disk apparatus,
    the arm member is rotated when the disk inserted from the disk insertion port is stored in the disk apparatus, whereby the protrusion is arranged near the disk insertion port and the protrusion provided on the arm member is engaged with the engagement portion of the rack plate moved sequentially with the storing of the disk into the disk apparatus, and if a disk other than the disk stored in the disk apparatus is to be erroneously inserted into the disk apparatus from the disk insertion port, the arm member that detects whether the disk is present is used as means for intercepting misinsertion of the other disk.

4. A disk apparatus including a disk misinsertion prevention mechanism, wherein the disk misinsertion prevention mechanism includes an arm member having a protrusion, wherein when the disk is inserted from a disk insertion port of the disk apparatus into the disk apparatus storing no disk, the arm member is rotated by inserting the disk from the disk insertion port of the disk apparatus into the disk apparatus while abutting a circumferential edge of the disk to the protrusion of the arm member, wherein the arm member detects whether or not a disk is present in the disk apparatus by rotation operation of the arm member, and wherein when the disk inserted from the disk insertion port is stored in the disk apparatus, the protrusion is arranged near the disk insertion port so that the protrusion prevents another disk from being inserted into the disk apparatus through the disk insertion port.

5. The disk apparatus according to claim 4, wherein the disk is one of a plurality of types of disks having different diameters of eight and twelve centimeters.

* * * * *